United States Patent
Johnson

(10) Patent No.: US 12,296,766 B2
(45) Date of Patent: May 13, 2025

(54) UTILITY TERRAIN VEHICLE FENDER SYSTEM

(71) Applicant: Matt Johnson, Mountain Lake, MN (US)

(72) Inventor: Matt Johnson, Mountain Lake, MN (US)

( * ) Notice: Subject to any disclaimer, the term of this patent is extended or adjusted under 35 U.S.C. 154(b) by 311 days.

(21) Appl. No.: 17/968,385

(22) Filed: Oct. 18, 2022

(65) Prior Publication Data

US 2024/0123928 A1    Apr. 18, 2024

(51) Int. Cl.
*B60R 19/00*    (2006.01)

(52) U.S. Cl.
CPC ........ *B60R 19/00* (2013.01); *B60R 2019/002* (2013.01); *B60Y 2200/25* (2013.01)

(58) Field of Classification Search
CPC ......... B60R 19/00; B60R 19/04; B60R 19/24; B60R 2019/002; B60Y 2200/25; B62D 55/065; B62D 55/084; B62D 55/0845; B62D 55/0842; B62D 55/188; B62D 55/168; B62D 55/244
USPC ........................................................ 293/112
See application file for complete search history.

(56) References Cited

U.S. PATENT DOCUMENTS

| | | | |
|---|---|---|---|
| 3,879,059 A * | 4/1975 | Gibes | B62D 25/168 280/848 |
| 5,839,743 A * | 11/1998 | Weinkauf | B62D 25/168 280/154 |
| 6,224,134 B1 | 5/2001 | Johnson | |
| 6,692,366 B1 | 2/2004 | Savant | |
| 6,874,590 B2 | 4/2005 | Rondeau | |
| 7,438,350 B1 | 10/2008 | Peterson | |
| D623,103 S * | 9/2010 | Braga | D12/181 |
| 8,844,999 B2 | 9/2014 | Bergman | |
| D774,104 S * | 12/2016 | Underhill | D15/28 |
| 10,882,566 B2 * | 1/2021 | Bering | B62D 24/04 |
| 11,260,920 B2 * | 3/2022 | Bender | B62D 25/188 |
| 11,413,953 B2 * | 8/2022 | Payne | B60W 10/10 |
| 2009/0267407 A1 * | 10/2009 | Bessette | B62D 55/108 305/135 |
| 2016/0075386 A1 * | 3/2016 | Zuchoski | B62D 55/10 305/142 |
| 2020/0339200 A1 * | 10/2020 | Couture | B62D 55/065 |

FOREIGN PATENT DOCUMENTS

WO    WO2006110687    10/2006

* cited by examiner

*Primary Examiner* — Amy R Weisberg
*Assistant Examiner* — Veronica M Shull

(57) ABSTRACT

A utility terrain vehicle fender system for reducing debris flying onto a utility terrain vehicle when driving includes a utility terrain vehicle and a plurality of removable tracks is rotatably coupled to the utility terrain vehicle. A fender is removably fastened to each removable track for reducing debris flying off the removable tracks onto the utility terrain vehicle.

5 Claims, 5 Drawing Sheets

UTILITY TERRAIN VEHICLE FENDER SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to vehicle fenders and more particularly pertains to a new vehicle fender for reducing debris flying from a track onto a utility terrain vehicle when the utility terrain vehicle is being driven over loose and/or wet terrain.

(2) Description of Related Art Including Information Disclosed Under 37 CFR 1.97 and 1.98

The prior art relates to vehicle fenders including a variety of fenders configured for attaching to a utility terrain vehicle or to an all-terrain vehicle. Known prior art lacks a vehicle fender being removably fastened to each removable track of a utility terrain vehicle to reduce debris from flying off each removable track on to the utility terrain vehicle.

BRIEF SUMMARY OF THE INVENTION

An embodiment of the disclosure meets the needs presented above by generally comprising a utility terrain vehicle and a plurality of removable tracks is rotatably coupled to the utility terrain vehicle. A fender is removably fastened to each removable track and is configured for reducing debris flying off the removable tracks onto the utility terrain vehicle.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
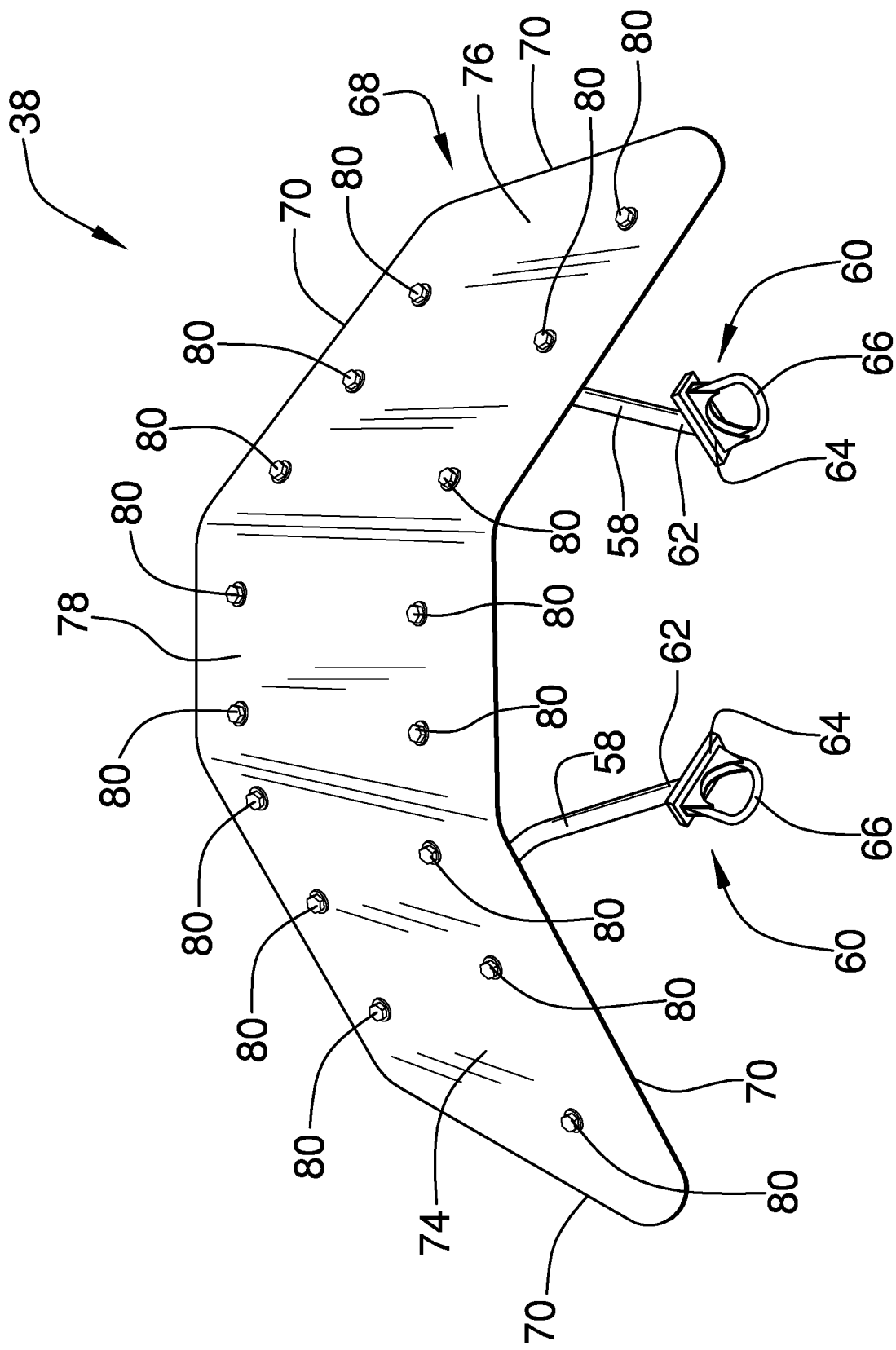
FIG. 1 is a front view of a utility terrain vehicle fender system according to an embodiment of the disclosure.
Figure 2:
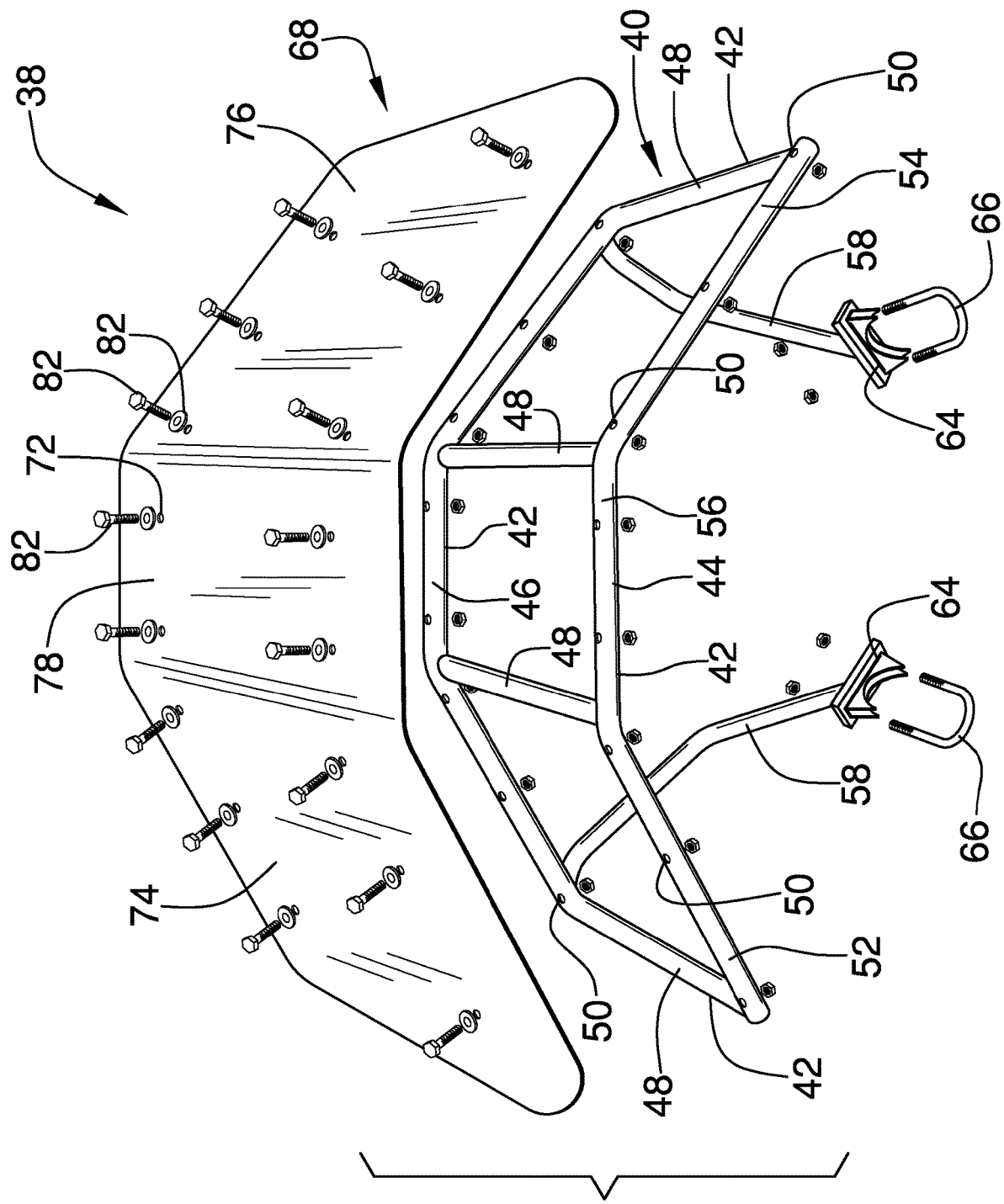
FIG. 2 is an exploded view of an embodiment of the disclosure.
Figure 4:
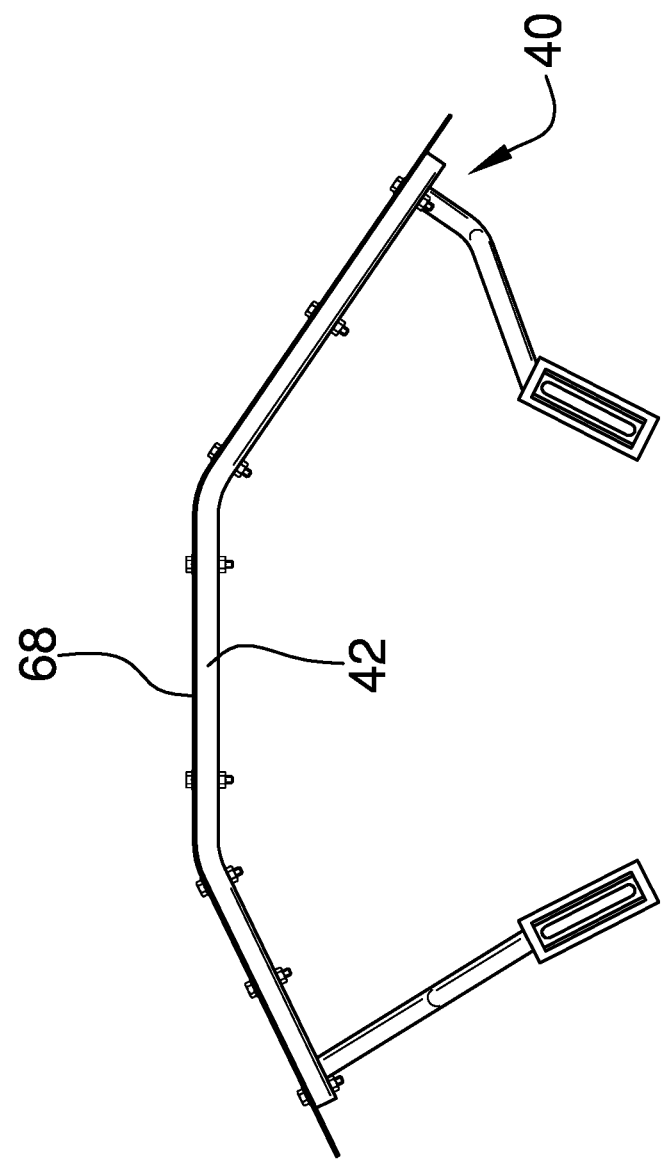
FIG. 4 is a front view of an embodiment of the disclosure.
Figure 3:
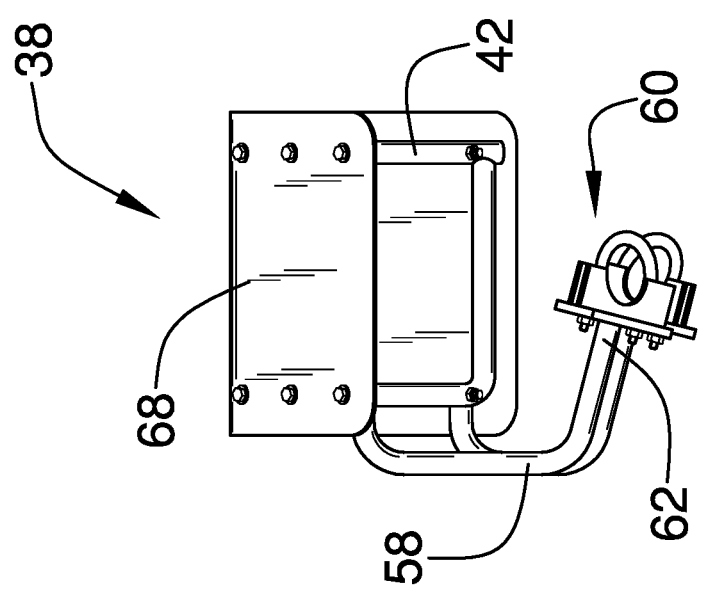
FIG. 3 is a side view of an embodiment of the disclosure.
Figure 5:
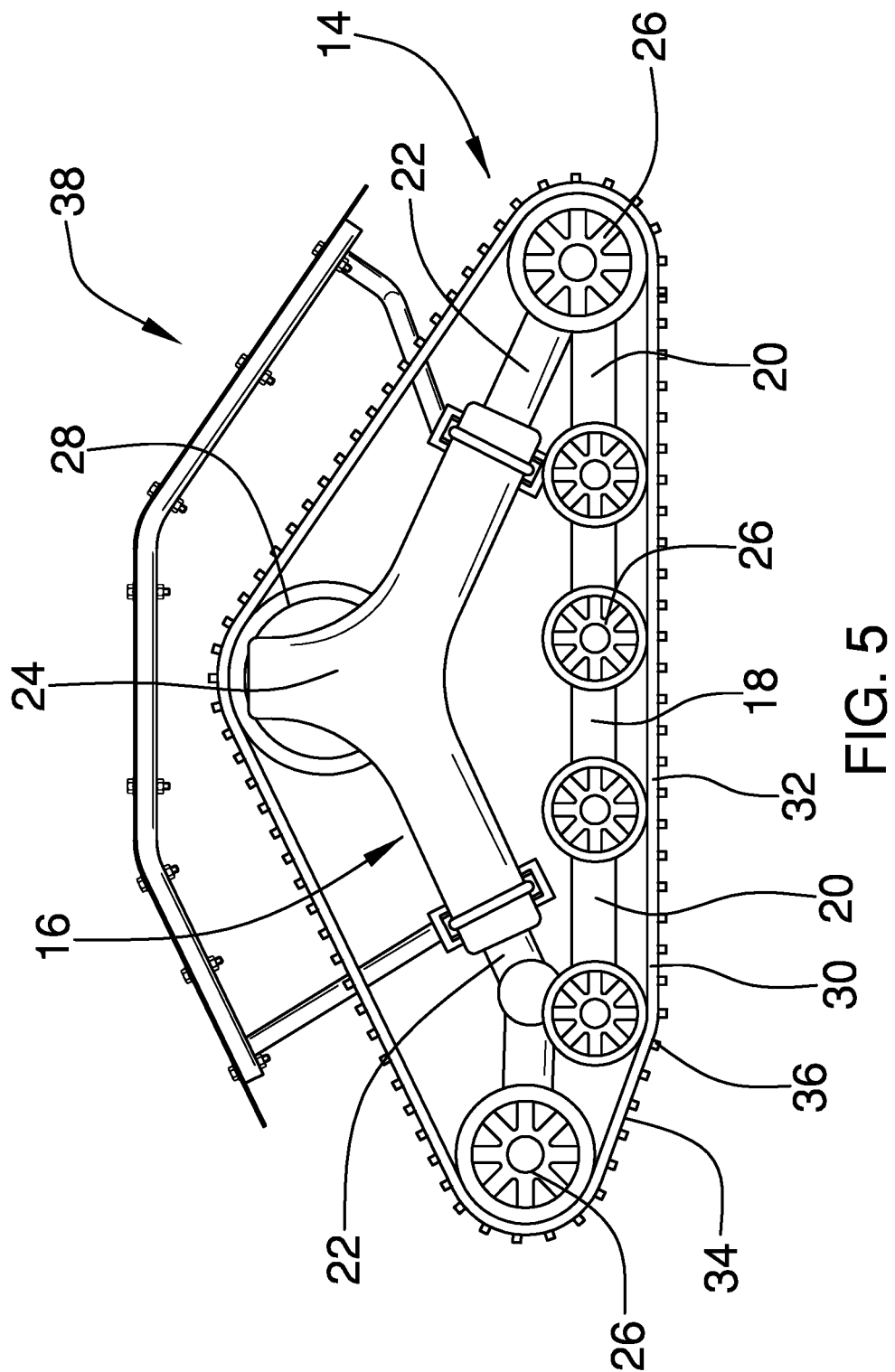
FIG. 5 is an in-use view of an embodiment of the disclosure.
Figure 6:
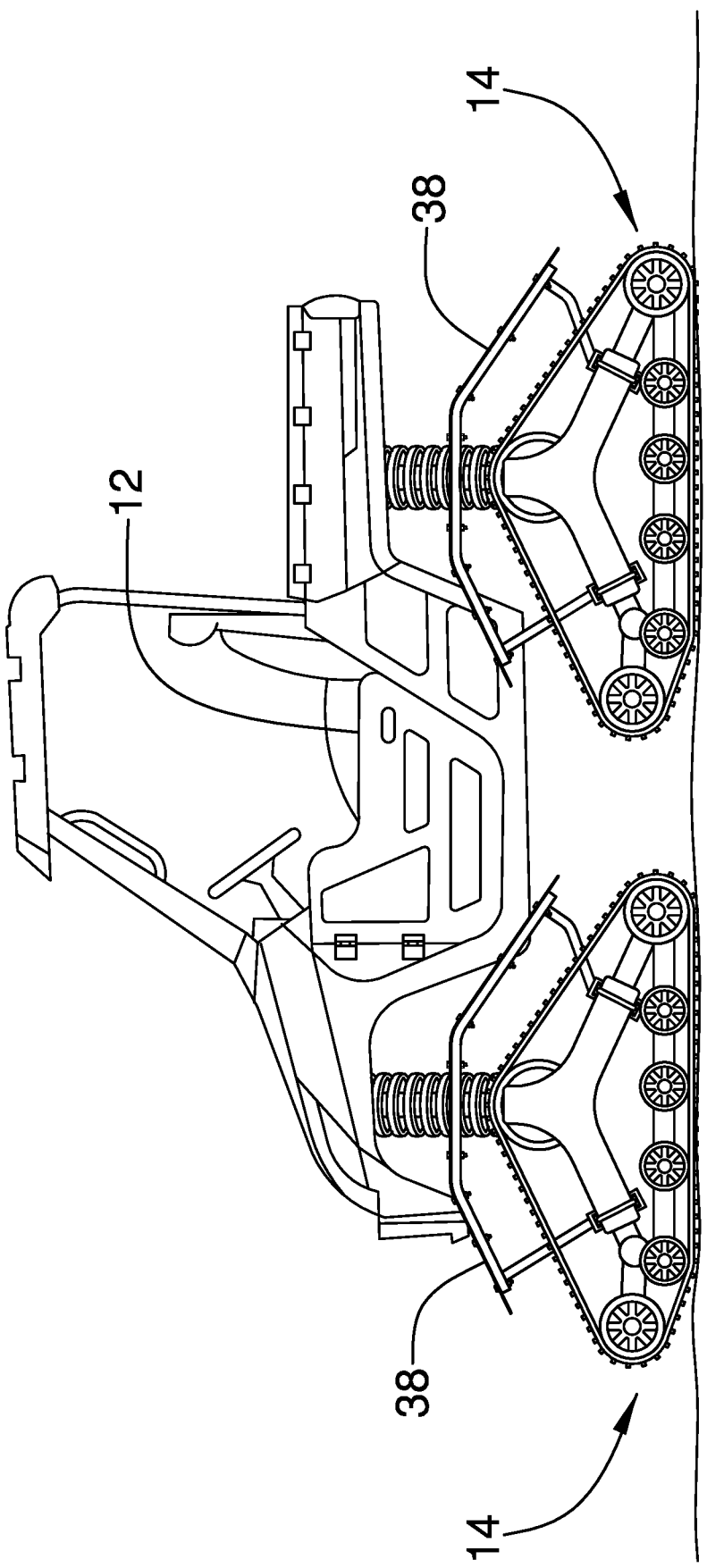
FIG. 6 is an in-use view of an embodiment of the disclosure.

With reference now to the drawings, and in particular to FIGS. 1 through 6 thereof, a new vehicle fender embodying the principles and concepts of an embodiment of the disclosure and generally designated by the reference numeral 10 will be described.

As best illustrated in FIGS. 1 through 6, the utility terrain vehicle fender system 10 generally comprises a utility terrain vehicle 12 and a plurality of removable tracks 14 is rotatably coupled to the utility terrain vehicle 12. Each removable track 14 typically has a triangular frame 16 including a lateral beam 18 having a pair of ends 20. A pair of angled beams 22 is attached to each end 20 and extends towards each other and couples to a junction 24. A plurality of lateral wheels 26 is rotatably coupled to the lateral beam 18 and a top wheel 28 is rotatably coupled to the junction 24. A continuous track 30 is mounted on each lateral wheel 26 and the top wheel 28 such that each lateral wheel 26 and the top wheel 28 rotate the continuous track 30. The continuous track 30 may comprise a semi-rigid band 32 such as rubber and will typically be a closed loop. The semi-rigid band 32 has an outside surface 34 including a plurality of feet 36 protruding therefrom and is configured for providing traction against the ground.

A fender 38 is removably fastened to each removable track 14 and is configured for reducing debris flying off the removable tracks 14 onto the utility terrain vehicle 12. The fender 38 includes a tubular frame 40 having a perimeter edge 42 including a front tube 44, a back tube 46, and a plurality of parallel tubes 48. The tubular frame 40 may comprise a rigid material such as stainless steel. The perimeter edge 42 will typically have a plurality of apertures 50 positioned on a top side of the perimeter edge 42 and extends therethrough. The tubular frame 40 has a first section 52, a second section 54, and a center section 56 positioned between the first 52 and second 54 sections. The first 52 and second 54 sections are angled downwardly relative to the center section 56.

A pair of rods 58 is coupled to and extends downwardly from the back tube 46 of the first 52 and second 54 sections. A pair of couplers 60 is attached to an end 62 of each rod 58 and is configured for removably fastening to each angled beam 22 of each removable track 14. Each of the couplers 60 may comprise a saddle 64 having a U-bolt 66 removably secured thereto such that each angled beam 22 is secured between the saddle 64 and the U-bolt 66 of each coupler 60.

A panel 68 is mounted on the perimeter edge 42 of the tubular frame 40 and is positioned above the continuous track 30 of each removable track 14. The panel 68 has a lateral edge 70 and a plurality of holes 72 is positioned proximate to the lateral edge 70 and extends therethrough. The plurality of holes 72 of the panel is positioned upon the plurality of apertures 50 of the tubular frame 40. The panel 68 has a primary section 74, a secondary section 76, and a middle section 78 positioned between the primary 74 and secondary 76 sections. The primary 74 and secondary 76 sections are angled downwardly relative to the middle section 78. A plurality of fasteners 80 removably secures the panel 68 to the tubular frame 40. Each fastener 80 will typically comprise a nut and bolt assembly 82 and each fastener 80 is removably inserted through one of each hole 72 and each aperture 50.

In use, each coupler 60 of the fender 38 is secured to each angled beam 22 of each removable track 14. The plurality of feet 36 of the continuous track 30 will typically pull up debris from the ground and release the debris while the continuous track 30 rotates. The fender 38 will reduce the debris from flying off the removable track 14 onto the utility terrain vehicle 12 wherein the fender 38 reduces the debris from affecting the vision of the user of the utility terrain vehicle 12. Each removable track 14 can be removed from the utility terrain vehicle 12 with the fender 38 attached to the removable track 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A utility terrain vehicle fender system comprising:
a utility terrain vehicle;
a plurality of removable tracks being rotatably coupled to said utility terrain vehicle;
a fender being removably fastened to each removable track and being configured for reducing debris flying off said removable tracks onto said utility terrain vehicle;
wherein each removable track has a triangular frame including a lateral beam having a pair of ends and a pair of angled beams being attached to each end and extending towards each other, said angled beams being coupled to a junction, a plurality of lateral wheels being rotatably coupled to said lateral beam, a top wheel being rotatably coupled to said junction, a continuous track being mounted on each lateral wheel and said top wheel such that each lateral wheel and said top wheel rotating said continuous track, said continuous track comprising a semi-rigid band and being a closed loop, said semi-rigid band having an outside surface including a plurality of feet protruding therefrom and being configured for providing traction against the ground;
wherein said fender includes a tubular frame having a perimeter edge including a front tube, a back tube, and a plurality of parallel tubes, said tubular frame comprising a rigid material, said perimeter edge having a plurality of apertures positioned on a top side of said perimeter edge and extending therethrough, said tubular frame having a first section, a second section, and a center section being positioned between said first and second sections, said first and second sections being angled downwardly relative to said center section; and
a pair of rods being coupled to and extending downwardly from said back tube of said first and second sections.

2. The utility terrain vehicle fender system of claim 1, further including a pair of couplers being attached to an end of each rod and being configured for removably fastening to each angled beam of each removable track, each of said couplers comprising a saddle having a U-bolt being removably secured thereto, each angled beam being secured between said saddle and said U-bolt of each coupler.

3. The utility terrain vehicle fender system of claim 2, further including a panel being mounted on said perimeter edge of said tubular frame and being positioned above said continuous track of each removable track, said panel having a lateral edge, said panel having a plurality of holes being positioned proximate to said lateral edge and extending therethrough, said plurality of holes of said panel being positioned upon said plurality of apertures of said tubular frame, said panel having a primary section, a secondary section, and a middle section being positioned between said primary and secondary sections, said primary and secondary sections being angled downwardly relative to said middle section.

4. The utility terrain vehicle fender system of claim 3, further including a plurality of fasteners, each fastener removably securing said panel to said tubular frame, each fastener comprising a nut and bolt assembly, each fastener being removably inserted through one of each hole and each aperture.

5. A utility terrain vehicle fender system comprising:
a utility terrain vehicle;
a plurality of removable tracks being rotatably coupled to said utility terrain vehicle, each removable track having a triangular frame including a lateral beam having a pair of ends and a pair of angled beams being attached to each end and extending towards each other, said angled beams being coupled to a junction, a plurality of lateral wheels being rotatably coupled to said lateral beam, a top wheel being rotatably coupled to said junction, a continuous track being mounted on each lateral wheel and said top wheel such that each lateral wheel and said top wheel rotating said continuous track, said continuous track comprising a semi-rigid band and being a closed loop, said semi-rigid band having an outside surface including a plurality of feet protruding therefrom and being configured for providing traction against the ground;
a fender being removably fastened to each removable track and being configured for reducing debris flying off said removable tracks onto said utility terrain vehicle, said fender including:
  a tubular frame having a perimeter edge including a front tube, a back tube, and a plurality of parallel tubes, said tubular frame comprising a rigid material, said perimeter edge having a plurality of apertures positioned on a top side of said perimeter edge and extending therethrough, said tubular frame having a first section, a second section, and a center section being positioned between said first and second sections, said first and second sections being angled downwardly relative to said center section;
  a pair of rods being coupled to and extending downwardly from said back tube of said first and second sections;
  a pair of couplers being attached to an end of each rod and being configured for removably fastening to each angled beam of each removable track, each of said couplers comprising a saddle having a U-bolt being removably secured thereto, each angled beam being secured between said saddle and said U-bolt of each coupler;
  a panel being mounted on said perimeter edge of said tubular frame and being positioned above said continuous track of each removable track, said panel having a lateral edge, said panel having a plurality of holes being positioned proximate to said lateral edge and extending therethrough, said plurality of holes of said panel being positioned upon said plurality of apertures of said tubular frame, said panel having a primary section, a secondary section, and a middle section being positioned between said primary and secondary sections, said primary and secondary sections being angled downwardly relative to said middle section; and
  a plurality of fasteners, each fastener removably securing said panel to said tubular frame, each fastener comprising a nut and bolt assembly, each fastener being removably inserted through one of each hole and each aperture.

\* \* \* \* \*